US012391213B2

(12) United States Patent
Ette

(10) Patent No.: US 12,391,213 B2
(45) Date of Patent: Aug. 19, 2025

(54) METHOD FOR MONITORING A TRANSPORTATION VEHICLE AND TRANSPORTATION VEHICLE

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 71 days.

(21) Appl. No.: 18/505,226

(22) Filed: Nov. 9, 2023

(65) Prior Publication Data

US 2024/0157910 A1 May 16, 2024

(30) Foreign Application Priority Data

Nov. 10, 2022 (DE) ...................... 10 2022 211 889.8

(51) Int. Cl.
*B60R 25/10* (2013.01)
*B60R 25/01* (2013.01)
(Continued)

(52) U.S. Cl.
CPC .......... *B60R 25/1004* (2013.01); *B60R 25/01* (2013.01); *B60R 25/104* (2013.01); *B60R 25/31* (2013.01); *B60R 2325/101* (2013.01)

(58) Field of Classification Search
None
See application file for complete search history.

(56) References Cited

U.S. PATENT DOCUMENTS

| 7,102,537 | B2 | 9/2006 | Inoue et al. | |
| 10,311,661 | B2* | 6/2019 | Menard | H04W 4/80 |

(Continued)

FOREIGN PATENT DOCUMENTS

| DE | 102021207013 A1 | 1/2023 |
| JP | 2005098847 A | 4/2005 |

(Continued)

OTHER PUBLICATIONS

Office Action; Japanese Patent Application No. 2023-191478; Oct. 11, 2024.

(Continued)

*Primary Examiner* — Fekadeselassie Girma
(74) *Attorney, Agent, or Firm* — BARNES & THORNBURG LLP

(57) ABSTRACT

A method for monitoring a transportation vehicle, wherein the transportation vehicle has a radio system with a transceiver, having a first UWB antenna and a second UWB antenna, and a control unit connected to the radio system, wherein the UWB antennas transmit and receive BLUETOOTH® radio signals and the radio system establishes BLUETOOTH® communication. The method includes controlling the radio system to transmit UWB pulses and receive impulse responses using at least one of the two UWB antennas; monitoring an exterior of the transportation vehicle for people based on a result of the received impulse responses; and activating a theft and/or vandalism protection of the transportation vehicle in response to a person being detected in the monitored exterior of the transportation vehicle.

18 Claims, 3 Drawing Sheets

(51) Int. Cl.
    *B60R 25/104*    (2013.01)
    *B60R 25/31*     (2013.01)

(56)         References Cited

U.S. PATENT DOCUMENTS

| | | | |
|---|---|---|---|
| 10,549,722 B2* | 2/2020 | Bilik | G01S 13/88 |
| 2004/0188164 A1* | 9/2004 | Maeno | B60R 25/1004 |
| | | | 180/287 |
| 2005/0068225 A1* | 3/2005 | Inoue | G01S 3/50 |
| | | | 455/39 |
| 2005/0275513 A1* | 12/2005 | Grisham | B60Q 9/008 |
| | | | 340/686.6 |
| 2012/0323474 A1* | 12/2012 | Breed | G08G 1/161 |
| | | | 701/117 |
| 2013/0325323 A1* | 12/2013 | Breed | G01C 21/3667 |
| | | | 701/420 |
| 2014/0306799 A1* | 10/2014 | Ricci | G06V 40/166 |
| | | | 340/5.83 |
| 2015/0197248 A1* | 7/2015 | Breed | G08G 1/096775 |
| | | | 340/905 |
| 2018/0050575 A1* | 2/2018 | Campbell | G01S 7/52006 |
| 2018/0154908 A1* | 6/2018 | Chen | B60R 25/102 |
| 2018/0334137 A1 | 11/2018 | Salter et al. | |
| 2019/0039571 A1* | 2/2019 | Shimizu | E05B 81/64 |
| 2019/0272729 A1* | 9/2019 | Staninger | G08B 21/22 |
| 2020/0118409 A1 | 4/2020 | Yang et al. | |
| 2020/0309932 A1* | 10/2020 | Zeng | G07C 5/08 |
| 2020/0406860 A1* | 12/2020 | Mai | B60R 25/31 |
| 2020/0408875 A1* | 12/2020 | Mai | G01S 7/006 |
| 2021/0021295 A1 | 1/2021 | Yun et al. | |
| 2022/0308195 A1* | 9/2022 | Zeng | G01S 13/003 |
| 2022/0317246 A1* | 10/2022 | Raj | B60N 2/266 |
| 2023/0331189 A1* | 10/2023 | Baig | G06V 40/25 |

FOREIGN PATENT DOCUMENTS

| | | |
|---|---|---|
| JP | 2017141611 A | 8/2017 |
| JP | 2017538875 A | 12/2017 |
| JP | 2021136556 A | 9/2021 |
| JP | 2022158211 A | 10/2022 |
| KR | 20210008635 A | 1/2021 |
| WO | 2016046105 A1 | 3/2016 |
| WO | 2022074187 A1 | 4/2022 |
| WO | 2022074189 A1 | 4/2022 |
| WO | 2022115813 A1 | 6/2022 |

OTHER PUBLICATIONS

Office Action; Japanese Patent Application No. 2023-191478; Feb. 14, 2025.

Office Action; Korean Patent Application No. 10-2023-0149113; May 19, 2025.

* cited by examiner

METHOD FOR MONITORING A TRANSPORTATION VEHICLE AND TRANSPORTATION VEHICLE

PRIORITY CLAIM

This patent application claims priority to German Patent Application No. 10 2022 211 889.8, filed 10 Nov. 2022, the disclosure of which is incorporated herein by reference in its entirety.

SUMMARY

Illustrative embodiments relate to a method for monitoring a transportation vehicle and to a transportation vehicle having a radio system and a control unit connected to the radio system and designed to perform the method described herein.

BRIEF DESCRIPTION OF THE DRAWINGS

Disclosed embodiments are explained below with reference to the drawings, in which.

DETAILED DESCRIPTION

Figure 1:
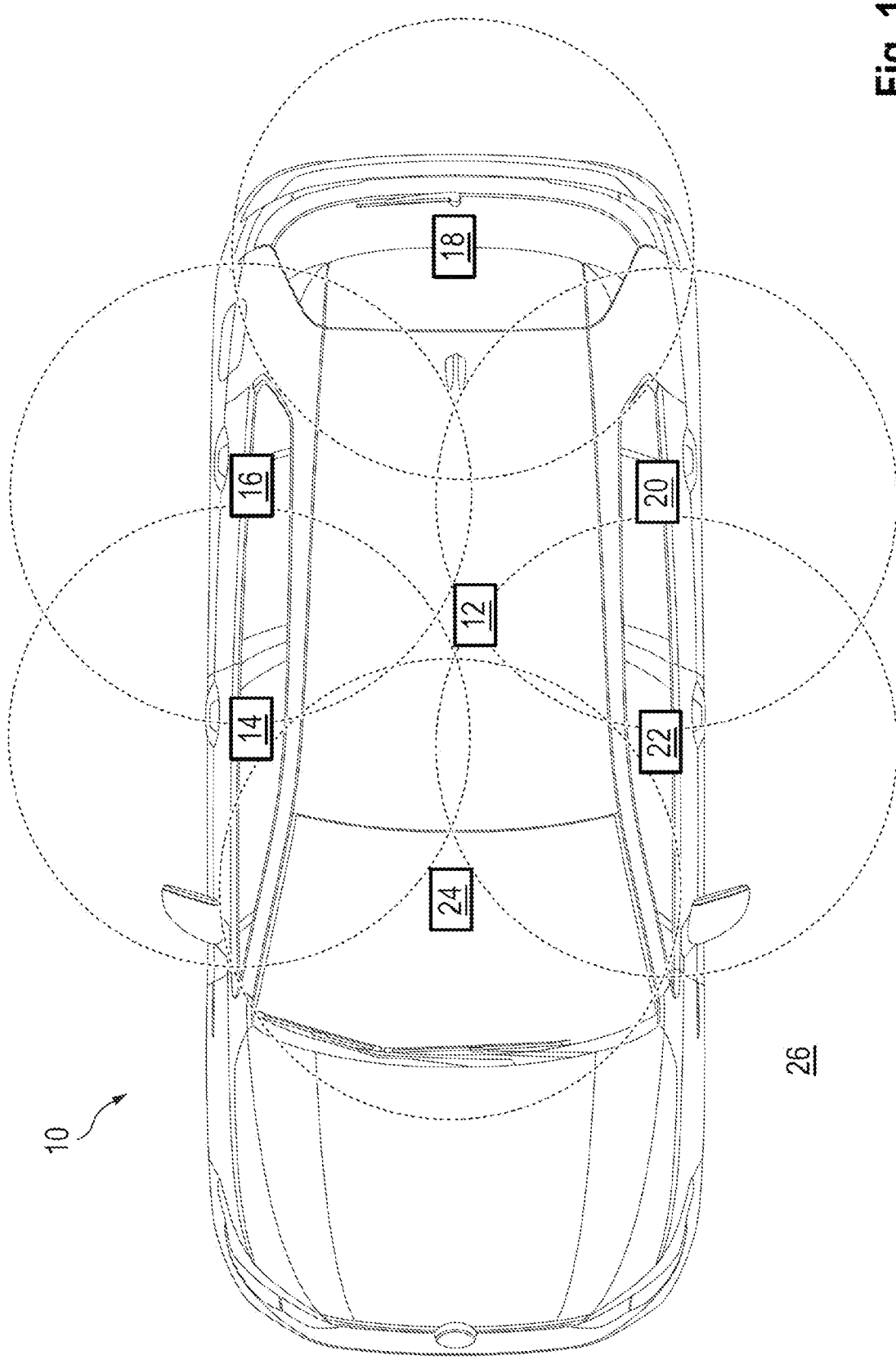
FIG. 1 shows a schematic representation of a disclosed transportation vehicle according to an exemplary embodiment with six UWB antennas.

Modern transportation vehicles include a variety of interior and exterior sensor systems that are used for different transportation vehicle functions. Often, even different technologies are used in the process. To implement the various functions, modern transportation vehicles therefore have a large number of control units installed, each of which implements individual ones of the various functions.

For example, document US 2014/0306799 A1 describes a system for detecting an intruder near or inside a transportation vehicle. In the event that an unauthorized user is detected within the transportation vehicle, the presented system takes a number of actions, such as notifying one or more authorized users of the transportation vehicle, locking the transportation vehicle, notifying emergency personnel or police, and outputting a visual or audible alarm. A variety of different sensors, such as optical sensors, motion sensors, vital signs sensors, and the like, are required to implement monitoring by the system.

The subsequently published prior art document DE 10 2021 207 013 A1 concerns a surveying unit for surveying a transportation vehicle interior and an environment of a transportation vehicle, a corresponding system as well as method and computer program. It is envisaged that UWB antennas, which are already installed in the transportation vehicle, are also used for monitoring to additionally monitor the exterior of the transportation vehicle. If a person is detected outside the transportation vehicle by micro radar measurement of the UWB antennas, the authorization of the person is checked by activating a keyless entry system of the transportation vehicle. If the person does not have the appropriate authorization, a warning can be output to the person or the vehicle owner to deter potential car thieves or warn the vehicle owner.

The problem is that the known monitoring systems are very comprehensive and complex. A large number of sensors, technologies and control devices are required, which makes the known systems error-prone. In addition, a large amount of electrical energy is required for monitoring. Especially when implementing an anti-theft system, an enormous energy consumption leads to the fact that transportation vehicles parked for a longer period of time can no longer be monitored due to a lack of consumed electrical energy.

To reduce the energy problem, document US 2018/0154908 A1 proposes an intelligent monitoring system. Here, the intelligent monitoring system basically operates in an intelligent sleep mode to save energy. Only when irregularities are detected inside, outside or around the transportation vehicle does the monitoring system start automatic monitoring and notify the vehicle owner.

Although the prior art already reveals partial solutions with regard to the energy problems in vehicle monitoring systems, there is still a desire for less complex and more energy-saving monitoring systems.

The disclosed embodiments now address the problem of providing a simplified and less expensive monitoring method for a transportation vehicle and a transportation vehicle designed to carry out the disclosed method.

The problem is solved by a method for monitoring a transportation vehicle and a transportation vehicle.

A first disclosed embodiment relates to a method for monitoring a transportation vehicle. The transportation vehicle has a radio system with a transceiver, with a first ultra-wideband (UWB) antenna and with a second UWB antenna, and a control unit connected to the radio system. The transceiver of the radio system is designed for transmitting and receiving signals in very large frequency ranges, in particular, in a frequency range from 3.1 GHz to 10.6 GHz, optionally in a frequency range from 3.5 GHz to 9 GHz, particularly optionally in a frequency range from 6 GHz to 8.5 GHz. The transmission power of the UWB pulses is low in this case. The bandwidth of the UWB signal is at least 500 MHz and the UWB transceiver may be designed to transmit signals with a transmit power between 0.5 mW/−41.3 dBm/MHz. Further, the transceiver may be designed according to the IEEE 802.15.4 standard (in particular, the sections on the UWB PHY layer) and optionally according to the IEEE 802.15.4z standard. By scattering the signals over such wide frequency ranges, UWB signals minimally interfere with other radio signals. The UWB antennas are further configured to transmit and receive BLUETOOTH® radio signals and the radio system is further configured to establish BLUETOOTH® communication.

According to an operation of the disclosed method, the radio system for transmitting UWB pulses and receiving impulse responses is controlled using at least one of the two UWB antennas. Based on a result of the received impulse responses, an exterior of the transportation vehicle is monitored for people.

Due to the highly temporally localized UWB pulses, it is possible to extract information relating to the propagation path of the UWB pulses from received UWB pulses with their impulse response resulting from the influence of the environment on the transmitted UWB pulse. Environmental influences are based on physical phenomena that deflect the UWB pulse from its geometrically prescribed path, such as refraction, diffraction, reflection, or attenuation. It is obvious that the propagation times of the signals or signal packets differ along different propagation paths and change depending on the presence or absence of objects in or near the propagation paths. Also, the pulse shape of the signals or signal packets is affected depending on the presence or absence of objects in or near the propagation paths. Thus, the presence or absence of people and objects in or near the propagation paths can be inferred based on the measurement of signals or signal packets transmitted along these propagation paths.

According to the method of the received impulse responses according to the disclosure, the UWB antenna that transmits the UWB signal also receives the impulse response of the environment. In this respect, an echo of the scanned environment is received. This echo usually forms a multitude of temporally resolved echo signals, which are reflected in the impulse response depending on the distance of these objects and/or persons to the transceiver. By comparing the echo signals via temporally offset UWB pulses and their received impulse responses, conclusions can be drawn about changes in the location of the objects and/or persons with respect to the transceiver. Optionally, movements, particularly vital parameters, can be determined from the changes in location, in particular, to delimit persons from motionless or moving but vital-parameter-less objects. The echo signals can also be determined on the basis of amplitude and/or phase information and compared with one another. This makes it possible to scan the interior and/or exterior of the transportation vehicle using at least one antenna in a spatially and temporally resolved manner. Of course, both UWB antennas or other UWB antennas installed in the transportation vehicle can also perform the method of the received impulse responses to scan the exterior and/or interior of the transportation vehicle in a spatially and temporally resolved manner from different angles. Understandably, the radio system may comprise a plurality of UWB antennas, wherein the UWB antennas are arranged in the transportation vehicle according to the respective desired exterior region of the transportation vehicle to be monitored. Optionally, UWB antennas already present in the transportation vehicle are used multifunctionally to save costs.

The further away an object is from the transceiver, the later the echo signal assigned to the object is received by the transceiver. Thus, a range of the transceiver can be limited by interrupting a reception of the impulse response after a time corresponding to the desired range and/or by transmitting a new UWB pulse. During the time in which the UWB pulse is transmitted by the transceiver, no reception of the impulse response by the transceiver used for transmission is possible. Consequently, the exterior region of the transportation vehicle to be monitored can be selectively set or restricted.

In a further operation of the disclosed method, a theft or vandalism protection of the transportation vehicle is activated on the condition that a person has been detected in the monitored exterior region of the transportation vehicle. In other words, a vehicle-side reaction to a person detected using the UWB technology takes place in the exterior region of the transportation vehicle. By using the UWB technology, a different exterior region of the transportation vehicle can be monitored depending on the arrangement of the individual UWB antennas. In this respect, the method can be implemented in a targeted and cost-effective way. In addition, the UWB antennas arranged in the transportation vehicle allow other vehicle functions to be combined in the UWB technology. This reduces the number of control units installed in the transportation vehicle.

Optionally, the exterior of the transportation vehicle is continuously monitored. For the purposes of this disclosure, 'continuously' means that the exterior of the transportation vehicle is monitored in periodically repeating scans by transmitting UWB pulses and receiving the pulse responses via the UWB antenna. Particularly optionally, a time interval between the scans is a value in the millisecond range from 20 ms to 500 ms, in particular, 20 ms to 100 ms, to enable energy-saving monitoring.

In a disclosed embodiment, it is provided that when the theft and/or vandalism protection of the transportation vehicle is activated, an alarm is output, a central locking system of the transportation vehicle is activated to lock the transportation vehicle, and/or a scanning rate of the exterior of the transportation vehicle is increased by the radio system. The alarm may be output visually, for example, by activating the headlights and/or the interior lighting, acoustically, for example, by actuating the horn or by playing an audio file, and/or by communication via a communication interface of the transportation vehicle, for example, using the existing UWB antennas, with a user of the transportation vehicle stored in a memory unit of the transportation vehicle. The output of the alarm serves to deter a potential thief and to warn the user of the transportation vehicle, while the activation of the central locking system locks the vehicle doors if the driver should have forgotten to do so when leaving the transportation vehicle. By increasing the scanning rate of the radio system, the acquired information density per unit of time is increased to strengthen the informative value of the received impulse responses and to reduce the occurrence of misinterpretations. Situationally, an increased scanning rate of the monitored exterior of the transportation vehicle in the microsecond range, for example, 10 µs to 1000 µs, optionally 100 µs to 500 µs, is thus optionally provided.

In a further disclosed embodiment, it is provided that the activation of the theft and/or vandalism protection of the transportation vehicle further takes place on the condition that the person detected in the monitored exterior of the transportation vehicle stands or stops at an entry or access area of the transportation vehicle. Conventional theft and vandalism situations have in common the fact that the perpetrator stands or stops at least for a short period of time to carry out the act, for example, to reach into an open vehicle door, tailgate or window, to pick or force open the vehicle lock in the driver's door, etc. In this respect, it makes sense to activate the theft and/or vandalism protection depending on the behavior of the determined person to reduce the number of false activations of the theft and/or vandalism protection. The entry areas of the transportation vehicle substantially form the classic vehicle doors, while the access areas refer to window areas, the engine cover, the tailgate or luggage compartment lid and the like.

In a further disclosed embodiment, it is provided that the activation of the theft and/or vandalism protection of the transportation vehicle is further carried out on the condition that the person determined is not an authenticated person. This can reduce the number of false activations of the theft and/or vandalism protection. Authentication methods of persons by a transportation vehicle are known in principle. For example, authentication of a person is performed by receiving authentication data of the person via a communication interface with the transportation vehicle. In particular, UWB communication via the UWB antennas is a suitable communication technology. In other words, based on the UWB communication, a person approaching the transportation vehicle can be automatically authenticated by a transponder carried by them or by a mobile terminal for communication with the transportation vehicle. Additionally or alternatively, authentication can be performed using biometric recognition methods. Biometric recognition methods are methods that automatically recognize a person based on physiological characteristics, such as fingerprint, face, pattern of the iris or the like, or behavioral characteristics, such as voice, movement, signature or the like. For this purpose, the region of the human body that is required for the applied biometric method is scanned. The scanning is performed, for example, by a camera and/or a microphone of the transportation vehicle. Furthermore, the UWB antennas can be used to implement gesture control for authenticated persons.

In a further disclosed embodiment, the monitoring of the exterior of the transportation vehicle for persons is further provided to be performed depending on a closing state of the doors of the transportation vehicle. The closing state is indicative of an open or closed vehicle door. Since the user of the transportation vehicle generally closes the vehicle door(s) after parking and leaving the transportation vehicle or after entering the transportation vehicle, it makes sense to selectively couple the start of the monitoring of the exterior to this circumstance, i.e., when the doors of the transportation vehicle are closed. In this way, the energy consumption for the monitoring can be reduced. In modern transportation vehicles, the closing state of the doors is transmitted to the on-board computer of the transportation vehicle via sensor signals from (acceleration) sensors in the doors. Therefore, information on the closing states of the vehicle doors is generally available in modern transportation vehicles and can be used for the disclosed method. In addition or alternatively, however, the closing state of the doors can also be determined from the received impulse responses of the UWB sensors. In this way, for example, the sensors in the doors can be spared.

In a further disclosed embodiment, it is provided that a number of persons in the transportation vehicle is determined based on the result of the received impulse responses, and the monitoring of the exterior of the transportation vehicle for persons is carried out on the condition that no person is in the transportation vehicle. A person can be determined, for example, by comparing the received impulse response with a reference impulse response. In this case, the reference impulse response is the impulse response of an empty transportation vehicle, i.e., a transportation vehicle with no persons in the passenger compartment. The resulting differences between the received impulse response and the reference impulse response can then be used to determine changes in the interior, such as added or moved objects and/or persons. To distinguish a person from a (large) object, movements of the person, such as breathing or a heartbeat, i.e., a vital parameter of the person, can be determined over time from the received impulse responses. Accordingly, if it is determined that no person is present in the transportation vehicle, monitoring of the exterior of the transportation vehicle for persons is started or continued. This maps the circumstance that an offender usually chooses an empty transportation vehicle for his crime. Consequently, the energy consumption of the monitoring can be reduced. Additionally or alternatively, an occupancy state of the transportation vehicle can also be determined using conventional sensors, such as pressure sensors in the seats or interior cameras, and can be used to start or continue monitoring of the exterior of the transportation vehicle.

In a further disclosed embodiment, it is provided that, based on the result of the received impulse responses, it is determined whether one or all of the persons determined to be in the transportation vehicle are children or animals, wherein an alarm is output if the child or children or animals are alone in the transportation vehicle. Optionally, the alarm is not output until the vehicle doors have been locked. Thus, the transportation vehicle will output an alert if the determined child or children or animals appear to have been forgotten and locked in the transportation vehicle, so as to provide a child or animal protection function, respectively. Animals, in particular, dogs, cats and the like, generate impulse responses similar to children, and therefore such a distinction is sometimes difficult. This is not a problem, however, since both animals and children are usually unable to open a vehicle door and thus need to be especially protected from being left alone in the transportation vehicle.

In a further disclosed embodiment, it is provided that a seat occupancy of the transportation vehicle is determined based on the result of the received impulse responses, and interior monitoring is performed depending on the determined seat occupancy. In other words, passenger compartment monitoring is performed when at least one person (or animal) has been detected in the passenger compartment of the transportation vehicle. The passenger compartment monitoring may integrate a plurality of functions, such as a seat belt warning, an air bag control, a driver drowsiness detection, a detection of breathing and/or heart rates of the persons in the transportation vehicle to identify emergencies, a misuse detection, and/or the like. Misuse is present, for example, when there is a detection of desired functions with similar behavior, such as when an object in the transportation vehicle moves or is detected displaced from a reference impulse response.

In another disclosed embodiment, it is further provided that controlling the radio system to perform a method based on channel impulse response (OR) measurements is performed using the first UWB antenna and the second UWB antenna, and monitoring of the exterior of the transportation vehicle for people is further performed based on a result of the CIR measurements. Additionally or alternatively, the functions referred to herein based on the received impulse response may be implemented using CIR measurements.

Using at least two UWB antennas, it is possible to scan the environment with spatial resolution by the OR measurements. By sending multiple UWB pulses via one of the antennas and using the impulse responses received by the other antenna, changes in the environment—for example, a new object located in the area to be scanned—can be made visible in a spatially and temporally resolved manner by comparing the time-shifted impulse responses. In this way, the detection of an object entering the area to be scanned is reliably possible. In particular, a constant and/or repetitive scanning of the environment by CIR measurements allows appropriate monitoring of the area to be scanned. Optionally, the UWB antennas are controlled alternately for receiving the impulse responses and for performing the CIR measurements. The combination of both UWB technologies increases the informative value of the scans made by the radio system, reducing the occurrence of misinterpretations. Consequently, the monitoring quality and the occurrence of false activations of the theft and/or vandalism protection of the transportation vehicle can be improved.

The CIR measurements include, for example, the sending of predefined signals or signal packets (so-called telegrams) between the (at least) two UWB antennas. In addition to a direct propagation path of the signal or the signal packets between the UWB antennas, there are a variety of other propagation paths that include, for example, reflections from objects inside or outside the transportation vehicle. Based on a sufficient number and/or a beneficial arrangement of the UWB antennas, these propagation paths enable coverage of wide parts of a space, for example, a vehicle interior and/or a vehicle exterior. Of course, the CIR measurements can be made between a plurality of UWB antennas to scan corresponding areas, in particular, an interior and/or exterior region of a transportation vehicle, depending on the arrangement of the UWB antennas. Analogously to the described method of received impulse responses, one or more persons in the transportation vehicle can be scanned by CIR measurements with seat position accuracy or resolution. Likewise, movements of the persons, in particular, the chest movement when breathing and/or a heartbeat of the persons, can be resolved from the OR measurements.

A further disclosed embodiment includes a transportation vehicle having a radio system and a control unit connected to the radio system. The radio system includes a transceiver having a first UWB antenna and a second UWB antenna. The UWB antennas are further designed to transmit and receive BLUETOOTH® radio signals, and the radio system is further designed to establish BLUETOOTH® communication. The control unit is designed to perform the method described herein. The features described with the method and the benefits thereof can be implemented analogously with the transportation vehicle and can therefore be combined with each other as desired.

The above-mentioned control unit of the transportation vehicle may be implemented by electrical or electronic parts or components (hardware) or by firmware (ASIC). Additionally or alternatively, the functionality of the control unit is realized when executing a suitable program (software). Also, the control unit may be realized by a combination of hardware, firmware and/or software. For example, individual components of the control unit for providing individual functionalities are designed as a separate integrated circuit or are arranged on a common integrated circuit.

The individual components of the control unit are further designed as one or more processes running on one or more processors in one or more electronic computing devices and generated when one or more computer programs are executed. The computing devices may be designed in this case to cooperate with other components, for example, a central locking system, a motor controller, etc., to implement the functionalities described herein. The instructions of the computer programs may be stored here in a memory, such as a RAM element. However, the computer programs may also be stored in a non-volatile storage medium, such as a CD-ROM, flash memory, or the like.

It is further apparent to a person skilled in the art that the functionalities of multiple computing units (data processing devices) may be combined, or may be combined in a single device, or that the functionality may be distributed from a particular data processing device to a plurality of devices to implement the functionality of the control unit.

Another exemplary embodiment relates to a computer program comprising instructions which, when the program is executed by a computer, such as a control unit of a transportation vehicle comprising a radio system with a transceiver comprising a first UWB antenna and a second UWB antenna, cause the latter to carry out the disclosed method, in particular, a method for monitoring a transportation vehicle.

The various exemplary embodiments mentioned in this application can be combined with each other, unless otherwise specified in the individual case.

Figure 2:
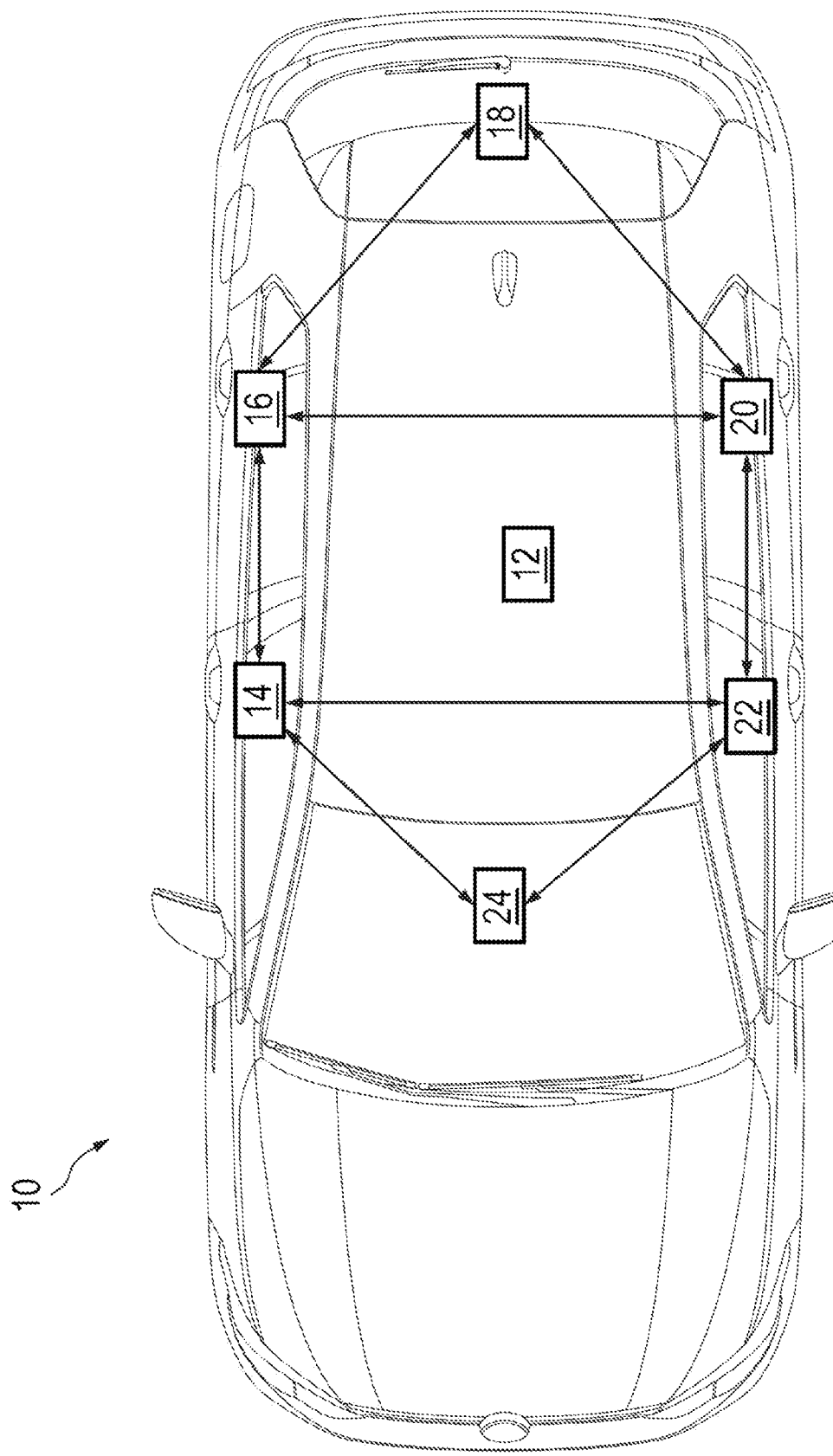
FIG. 2 shows a schematic representation of a disclosed transportation vehicle with six UWB antennas according to a further disclosed embodiment.

FIGS. 1 and 2 each show a schematic representation of a transportation vehicle 10 according to two exemplary embodiments, each with six UWB antennas 14, 16, 18, 20, 22, 24. Looking at FIG. 3, a method for monitoring the transportation vehicle 10 according to at least one exemplary embodiment is explained in greater detail.

The transportation vehicle 10 comprises a radio system with a transceiver with a first to sixth UWB antenna 14, 16, 18, 20, 22, 24 and a control unit 12 connected to the radio system. The control unit 12 is designed to carry out the method described in conjunction with FIG. 3. Five of the six UWB antennas 14, 16, 18, 20, 22, 24 are distributed over the five doors of the transportation vehicle 10 and the sixth UWB antenna 24 is arranged in the region of the interior rear-view mirror of the transportation vehicle 10. More specifically, the first UWB antenna 14 is arranged in the passenger door, the second UWB antenna 16 is arranged in the door behind the passenger door, the third UWB antenna 18 is arranged in the tailgate, the fourth UWB antenna 20 is arranged in the door behind the driver's door, and the fifth UWB antenna 22 is arranged in the driver's door. The number and arrangement of the UWB antennas 14, 16, 18, 20, 22, 24 is merely exemplary in nature and is provided for ease of understanding. Accordingly, the disclosure is not limited to the arrangement and number of UWB antennas 14, 16, 18, 20, 22, 24 shown. Further, UWB antennas already installed in the transportation vehicle 10 may be used. Modern transportation vehicles sometimes include UWB antennas installed in the transportation vehicle 10 for the purpose of keyless entry. Consequently, the already installed UWB antennas can be used multifunctionally and costs can be saved.

The circles drawn in dashed lines around UWB antennas 14, 16, 18, 20, 22, 24 in FIG. 1 represent an exemplary range of each UWB antenna 14, 16, 18, 20, 22, 24 when each is controlled to transmit UWB pulses and receive impulse responses. A range of a respective UWB antenna 14, 16, 18, 20, 22, 24, in other words the radius of the exemplary drawn circles, is one meter. In principle, good results can be achieved at ranges between 0.1 meters and 1.5 meters. It is intuitively shown that using the exemplarily arranged six UWB antennas 14, 16, 18, 20, 22, 24, the interior of the transportation vehicle 10 is completely covered and an exterior 26 of the transportation vehicle 10 is at least partially covered. The coverage of the exterior 26 includes in particular entry and access areas of the transportation vehicle 10, i.e., substantially the areas in front of the vehicle doors and the luggage compartment lid. It is understandable that the ranges of the UWB antennas 14, 16, 18, 20, 22, 24 can also be set larger (or smaller) so that, for example, the entire vehicle shell can be covered by the UWB antennas 14, 16, 18, 20, 22, 24 to be able to monitor, for example, the entire vehicle shell for vandalism damage.

The exemplary embodiment of the transportation vehicle 10 shown in FIG. 2 differs from the disclosed embodiment shown in FIG. 1 only in that the UWB antennas 14, 16, 18, 20, 22, 24 are not driven to transmit UWB pulses and receive the respective impulse responses, but rather are driven to perform CIR measurements. The arrows represent some of the possible direct propagation paths between UWB antennas 14, 16, 18, 20, 22, 24. It should be mentioned that not all possible direct propagation paths between UWB antennas 14, 16, 18, 20, 22, 24 are shown for clarity. In other words, it is obvious that CIR measurements can also be made between other, in particular, all, UWB antennas 14, 16, 18, 20, 22, 24 to obtain information about people and objects along the propagation paths between the respective UWB antennas 14, 16, 18, 20, 22, 24. Further, it is not the case, as appears to be illustrated in FIG. 2, that the exterior 26 of the transportation vehicle 10 cannot be scanned with the CIR measurements. Rather, the UWB pulses of a single UWB antenna 14, 16, 18, 20, 22, 24 are transmitted in all spatial directions, so that the influences of the exterior 26 also deflect the UWB pulse from its geometrically prescribed path, such as by refraction, diffraction, reflection or attenuation, and these are therefore received by other, in particular, adjacent, UWB antennas 14, 16, 18, 20, 22, 24. Consequently, the exterior 26 of the transportation vehicle 10 can also be monitored for persons by the CIR measurements.

The UWB antennas 14, 16, 18, 20, 22, 24 can be controlled not only according to the exemplary embodiment shown in FIG. 1 or according to the disclosed embodiment shown in FIG. 2, but rather the UWB antennas 14, 16, 18, 20, 22, 24 can also be driven alternately according to each of the exemplary embodiments shown in FIGS. 1 and 2. The combination of the two UWB technologies (the received impulse response and the CIR measurements) increases the informative value of the scans made by the radio system, further reducing the occurrence of misinterpretations.

The transportation vehicle 10 further comprises a communication interface connected to the control unit 12 and the radio system. Each of the UWB antennas 14, 16, 18, 20, 22, 24 may be arranged in a housing that includes a display. The display and the UWB antennas 14, 16, 18, 20, 22, 24 may be arranged above the metal structures of the transportation vehicle 10, such as the vehicle doors, behind the vehicle windows. This has the benefit that the display is visible from the outside and the UWB antennas 14, 16, 18, 20, 22, 24 have a better range into the exterior 26 of the transportation vehicle 10.

In some disclosed embodiments, the transportation vehicle 10 further comprises one or a plurality of accelerometers. The accelerometer may be used, for example, to detect vehicle door closing conditions or vandalism activity on the transportation vehicle 10, particularly in areas not covered by the UWB measurements. The UWB antennas 14, 16, 18, 20, 22, 24 may be further arranged for transmitting and receiving BLUETOOTH® radio signals. Here, the radio system may be controlled to establish UWB or BLUETOOTH® communication with communication methods or mechanisms present in the vehicle environment, such as a transponder or mobile terminal of a user of the transportation vehicle 10. Optionally, the BLUETOOTH® communication takes place in the known frequency band between 2.402 GHz and 2.480 GHz. Optionally, BLUETOOTH® low-energy radio technology is provided. By methods or mechanisms of the communication, authentication data of a user of the transportation vehicle 10 can be transmitted to the transportation vehicle 10. Further, time-of-flight measurements can be used to determine a distance and a relative position of the user with respect to the transportation vehicle 10.

Figure 3:
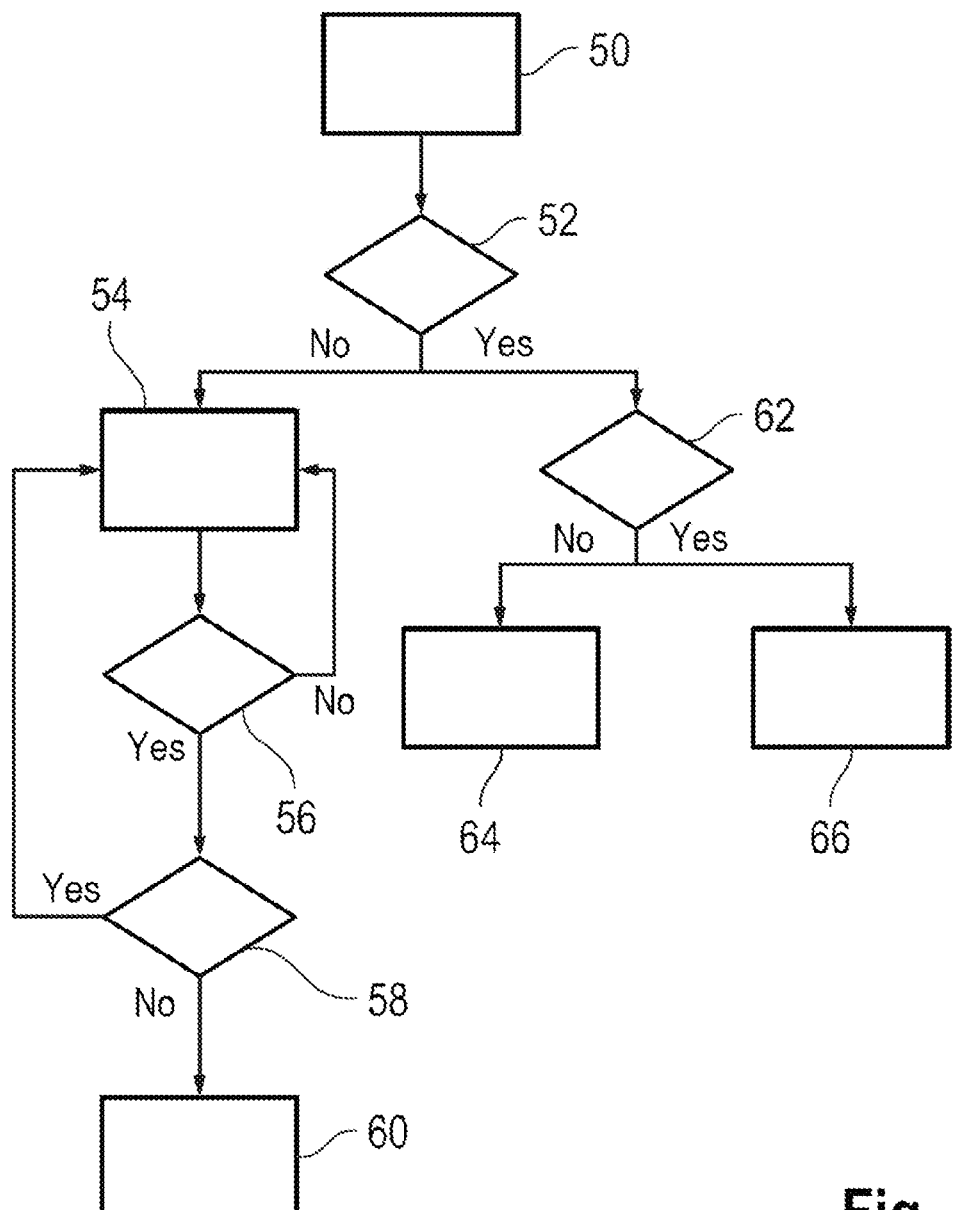
FIG. 3 shows a schematic representation of a disclosed method according to an exemplary embodiment.

FIG. 3 shows a schematic representation of a method for monitoring the transportation vehicle 10 according to an implementation form. In a first method operation at 50, a closing state of the vehicle doors is checked. This is done, for example, using the acceleration sensors installed in the vehicle doors. If the check shows that all vehicle doors have been closed, a second method operation at 52 is performed.

In the second method operation, the UWB antennas 14, 16, 18, 20, 22, 24 are alternately driven to transmit UWB pulses and receive the impulse responses and to perform CIR measurements. Based on a result of the receiving impulse responses and the OR measurements, a number of people in the transportation vehicle 10 is determined. This may be done by a comparison of the receiving impulse responses with a reference impulse response of an empty transportation vehicle 10 stored in a memory of the transportation vehicle 10, and a comparison of the CIR measurements with reference CIR measurements of the empty transportation vehicle 10 stored in the memory of the transportation vehicle 10. If the comparisons indicate differences that are due to a displaced static object in the transportation vehicle 10 rather than a person, the most recent impulse response is stored in the memory as a new reference impulse response and the most recent CIR measurements are stored in the memory as new reference CIR measurements.

If it is determined in the second method operation at 52 that no person is present in the transportation vehicle 10, a third method operation at 54 is performed. In the third method operation at 54, the UWB antennas 14, 16, 18, 20, 22, 24 are alternately driven to transmit UWB pulses and receive the impulse responses and to perform OR measurements.

In a fourth method operation at 56, the exterior 26 of the transportation vehicle 10 is monitored for persons based on the results of the receiving impulse responses and the CIR measurements. If the fourth method operation at 56 determines that there is no person in the monitored exterior 26 of the transportation vehicle 10, the method returns to the third method operation at 54.

If, on the other hand, a person is detected in the monitored exterior 26 of the transportation vehicle 10, it is checked whether the person is authenticated. To this end, a check is made, for example, to determine whether authentication data has been transmitted from the detected person to the transportation vehicle 10 by UWB or BLUETOOTH® communication (fifth method operation at 58). If this is the case, the method returns to the third method operation at 54.

If, on the other hand, the fifth method operation at 58 determines that no authentication data of the determined person is available, a theft and vandalism protection of the transportation vehicle 10 is activated (sixth method operation at 60). For this purpose, an alarm is output to the authenticated user of the transportation vehicle 10 using the communication interface of the transportation vehicle 10 and it is checked whether the vehicle doors are locked. If this is not the case, the central locking system is activated to lock the vehicle doors.

In the activated theft and vandalism protection of the transportation vehicle 10, the third method operation at 54 is repeated at time intervals of 20 ms to check whether the detected person has left the monitored exterior 26 of the transportation vehicle 10 or whether another person has entered the exterior 26. If it is detected in the activated theft and vandalism protection that the closing state of the vehicle doors has changed, the method returns to the first method operation at 50.

In the event that the second method operation at 52 determines that at least one person is detected in the transportation vehicle 10, a seventh method operation at 62 is performed. In the seventh method operation at 62, the UWB antennas 14, 16, 18, 20, 22, 24 are alternately controlled to transmit UWB pulses and receive the impulse responses and to perform CIR measurements, and it is verified from the results of the received impulse responses and CIR measurements whether the person detected in the transportation vehicle 10 is a child or an animal.

If this is not the case, an eighth method operation at 64 is performed. Here, based on the results of the receiving impulse responses and the CIR measurements, a seat occupancy of the transportation vehicle 10 is determined and, depending on the determined seat occupancy, an interior monitoring is performed. The interior monitoring is performed by alternately driving the UWB antennas 14, 16, 18, 20, 22, 24 to transmit UWB pulses and receive the impulse responses and to perform CIR measurements. In the case of interior monitoring, various functions such as seat belt warnings, air bag controls, a driver drowsiness detection, detections of breathing and/or heart rates of the persons in the transportation vehicle for emergency identification, a gesture detection for the purpose of gesture control, a misuse detection, and/or the like are performed. Due to the fact that the aforementioned functions can be implemented using the UWB antennas 14, 16, 18, 20, 22, 24 and corresponding evaluation, a high number of components as would be necessary to fulfill the various functions, such as a wide variety of sensors and control units, can be spared. In particular, ultrasonic sensors, tilt sensors and their control units for scanning the interior of the transportation vehicle 10 are not required, nor are seat occupancy mats or sensors for determining seat occupancy and no further control unit for controlling seat belt warnings and the airbags. Also, the radar sensors commonly used in child detection, for example, 70 GHz radar sensors, can be spared. If it is detected in the activated interior monitoring that the closing state of the vehicle doors has changed, the method returns to the first method operation at 50.

On the other hand, if the seventh method operation at 62 determines that the person is a child or an animal left alone in the transportation vehicle 10, a ninth method operation at 66 is performed. Here, an alarm with the information that a child or an animal has been left in the transportation vehicle 10 is output to the user of the transportation vehicle 10 stored in the memory using the communication interface of the transportation vehicle 10. If the closing state of the vehicle doors has changed, the method returns to the first method operation at 50.

LIST OF REFERENCE SIGNS

- 10 transportation vehicle
- 12 control unit
- 14 first UWB antenna
- 16 second UWB antenna
- 18 third UWB antenna
- 20 fourth UWB antenna
- 22 fifth UWB antenna
- 24 sixth UWB antenna
- 26 exterior of the transportation vehicle
- 50 first method operation
- 52 second method operation
- 54 third method operation
- 56 fourth method operation
- 58 fifth method operation
- 60 sixth method operation
- 62 seventh method operation
- 64 eighth method operation
- 66 ninth method operation

The invention claimed is:

1. A transportation vehicle comprising:
    a radio system having a transceiver, wherein the transceiver includes a first UWB antenna and a second UWB antenna, wherein the first and second UWB antennas are configured to transmit and receive BLUETOOTH® radio signals and to establish BLUETOOTH® communication; and
    a control unit connected to the radio system and configured to control the radio system to transmit UWB pulses and receive impulse responses using at least one of the two UWB antennas, to monitor an exterior of the transportation vehicle for people based on a result of the received impulse responses, and to activate a theft and/or vandalism protection of the transportation vehicle in response to a person being detected in the monitored exterior of the transportation vehicle,
    wherein the activation of the theft and vandalism protection of the transportation vehicle includes activating a central locking system of the transportation vehicle to lock the transportation vehicle and/or increasing a scanning rate of the exterior area of the transportation vehicle by the radio system.

2. The transportation vehicle of claim 1, wherein the activation of the theft and/or vandalism protection of the transportation vehicle further includes output of an alarm.

3. The transportation vehicle of claim 1, wherein the activation of the theft and/or vandalism protection of the transportation vehicle further takes place in response to the person detected in the exterior of the transportation vehicle standing or stopping at an entry or access area of the transportation vehicle.

4. The transportation vehicle of claim 1, wherein the activation of the theft and/or vandalism protection of the transportation vehicle is further carried out in response to the determined person not being an authenticated person.

5. The transportation vehicle of claim 1, wherein the monitoring of the exterior of the transportation vehicle for persons is further performed based on a closing state of the doors of the transportation vehicle.

6. The transportation vehicle of claim 1, wherein a number of persons in the transportation vehicle is determined based on the result of the received impulse responses, and the monitoring of the exterior of the transportation vehicle for persons is performed in response to no person being present in the transportation vehicle.

7. The transportation vehicle of claim 6, wherein it is determined whether any or all of the persons detected in the transportation vehicle are children or animals based on the result of the receiving impulse responses, wherein an alarm is output in response to the child or children or animals being alone in the transportation vehicle.

8. The transportation vehicle of claim 6, wherein a seat occupancy of the transportation vehicle is determined based on the result of the received impulse responses and an interior monitoring is performed based on the determined seat occupancy.

9. The transportation vehicle of claim 1, wherein the radio system is further controlled to perform a method based on channel impulse response (CIR) measurements using the first UWB antenna and the second UWB antenna, and the exterior of the transportation vehicle is monitored for people based on a result of the CIR measurements.

10. A method for monitoring a transportation vehicle, wherein the transportation vehicle comprises a radio system having a transceiver that includes a first UWB antenna and having a second UWB antenna, and a control unit connected to the radio system, wherein the UWB antennas are configured to transmit and receive BLUETOOTH® radio signals and to establish BLUETOOTH® communication, the method comprising:
    controlling the radio system to transmit UWB pulses and receive impulse responses using at least one of the two UWB antennas; and
    monitoring an exterior of the transportation vehicle for people based on a result of the received impulse responses; and activating a theft and/or vandalism protection of the transportation vehicle in response to a person being detected in the monitored exterior of the transportation vehicle, wherein the activating the theft and/or vandalism protection of the transportation vehicle includes activating a central locking system of the transportation vehicle to lock the transportation vehicle and increasing a scanning rate of the exterior area of the transportation vehicle by the radio system.

11. The method of claim 10, wherein activating the theft and/or vandalism protection of the transportation vehicle further comprises outputting an alarm.

12. The method of claim 10, wherein the activation of the theft and/or vandalism protection of the transportation vehicle further takes place in response to the person detected in the exterior of the transportation vehicle standing or stopping at an entry or access area of the transportation vehicle.

13. The method of claim 10, wherein the activation of the theft and/or vandalism protection of the transportation vehicle is further carried out in response to the determined person not being an authenticated person.

14. The method of claim 10, wherein the monitoring of the exterior of the transportation vehicle for persons is further performed based on a closing state of the doors of the transportation vehicle.

15. The method of claim 10, wherein a number of persons in the transportation vehicle is determined based on the result of the received impulse responses, and the monitoring of the exterior of the transportation vehicle for persons is performed in response to no person being present in the transportation vehicle.

16. The method of claim 15, wherein it is determined whether any or all of the persons detected in the transportation vehicle are children or animals based on the result of the receiving impulse responses, wherein an alarm is output in response to the child or children or animals being alone in the transportation vehicle.

17. The method of claim 16, wherein a seat occupancy of the transportation vehicle is determined based on the result of the received impulse responses and an interior monitoring is performed based on the determined seat occupancy.

18. The method of claim 11, wherein the radio system is further controlled to perform a method based on channel impulse response (CIR) measurements using the first UWB antenna and the second UWB antenna, and the exterior of the transportation vehicle is monitored for people based on a result of the CIR measurements.

* * * * *